(12) United States Patent
Schroader (10) Patent No.: US 7,938,252 B2
(45) Date of Patent: May 10, 2011

(54) UNSTACKING CONVEYOR WITH FLOATING SURFACE

(75) Inventor: Steven Vann Schroader, Louisville, KY (US)

(73) Assignee: Cinetic Sorting Corp., Louisville, KY (US)

( * ) Notice: Subject to any disclaimer, the term of this patent is extended or adjusted under 35 U.S.C. 154(b) by 216 days.

(21) Appl. No.: 11/962,916

(22) Filed: Dec. 21, 2007

(65) Prior Publication Data

US 2009/0159404 A1 Jun. 25, 2009

(51) Int. Cl.
*B65G 21/10* (2006.01)
(52) U.S. Cl. .................................. 198/535; 198/836.2
(58) Field of Classification Search ............... 198/860.1, 198/860.2, 860.3, 416, 417, 443, 447, 633, 198/535, 861.1, 861.2, 688.1, 836.1, 836.2
See application file for complete search history.

(56) References Cited

U.S. PATENT DOCUMENTS

| | | | | |
|---|---|---|---|---|
| 997,276 A * | 7/1911 | Curtis | ............................ | 193/27 |
| 1,017,433 A * | 2/1912 | Lovell et al. | .................. | 198/310 |
| 1,498,914 A * | 6/1924 | Hoffman | .................... | 198/836.2 |
| 1,629,776 A * | 5/1927 | Cutler | .................... | 198/836.2 |
| 2,164,128 A * | 6/1939 | Medenwald | .................... | 182/36 |
| 2,167,818 A * | 8/1939 | Wagner | ......................... | 198/359 |
| 2,221,236 A * | 11/1940 | Gay, Jr. | ........................ | 198/836.2 |
| 2,529,620 A * | 11/1950 | Marnach et al. | .............. | 460/114 |
| 2,785,810 A * | 3/1957 | Kneib | ........................... | 414/334 |
| 2,803,463 A * | 8/1957 | Congelli | ...................... | 473/111 |
| 2,844,926 A * | 7/1958 | Mattos | ............................ | 53/534 |
| 3,339,710 A | 9/1967 | Micgielse et al. | | |
| 3,819,030 A * | 6/1974 | Warner | ....................... | 198/626.4 |
| 3,963,117 A * | 6/1976 | Nausedas | ................... | 198/836.2 |
| 4,103,767 A * | 8/1978 | Warner | ......................... | 198/359 |
| 4,366,896 A * | 1/1983 | Tomosue | ....................... | 198/384 |
| 4,509,752 A * | 4/1985 | Schmid | ......................... | 473/111 |
| 4,678,076 A * | 7/1987 | Nenakhov et al. | ............ | 198/525 |
| 4,781,281 A | 11/1988 | Canziani | | |

(Continued)

FOREIGN PATENT DOCUMENTS

BE 664183 11/1965

(Continued)

OTHER PUBLICATIONS

European Search Report dated Mar. 13, 2009.

(Continued)

*Primary Examiner* — Gene Crawford
*Assistant Examiner* — William R Harp
(74) *Attorney, Agent, or Firm* — Harness, Dickey & Pierce, P.L.C.

(57) ABSTRACT

A conveyor system can includes a feed conveyor, a declined conveyor, and an inclined conveyor. A declined stationary surface is suspended above the declined conveyor and positioned to exert a counter-moment on the articles related to the weight of the stationary support surface and the coefficient of sliding friction of the stationary support surface that is sufficient to resist forward rotation of the articles down the declined conveyor. An inclined stationary support surface is suspended above the inclined conveyor and positioned to exert a forward-moment on the articles related to the weight of the stationary support surface and the coefficient of sliding friction of the stationary support surface that is sufficient to resist counter-rotation of the articles that results in movement of the articles down the inclined conveyor. The vertical height of the stationary surfaces can be adjusted. A related method is also described.

44 Claims, 4 Drawing Sheets

U.S. PATENT DOCUMENTS

| | | | |
|---|---|---|---|
| 4,815,582 A | | 3/1989 | Canziani |
| 4,938,335 A | | 7/1990 | Canziani |
| 5,072,663 A | * | 12/1991 | Ellis-Brown .................... 99/331 |
| 5,161,678 A | * | 11/1992 | Garvey ...................... 198/860.3 |
| 5,161,679 A | | 11/1992 | Russo |
| 5,473,339 A | | 12/1995 | Kanatani et al. |
| 5,682,977 A | * | 11/1997 | White ....................... 198/860.5 |
| 5,701,989 A | | 12/1997 | Boone et al. |
| 5,738,202 A | | 4/1998 | Ydoate et al. |
| 5,769,204 A | | 6/1998 | Okada et al. |
| 5,918,724 A | | 7/1999 | Terrell et al. |
| 5,934,438 A | | 8/1999 | Hilerich, Jr. |
| 5,950,800 A | | 9/1999 | Terrell et al. |
| 5,964,338 A | | 10/1999 | Schroader |
| 6,076,683 A | | 6/2000 | Okada et al. |
| 6,131,723 A | | 10/2000 | Schroader et al. |
| 6,491,154 B2 | | 12/2002 | Ydoate et al. |
| 6,557,696 B1 | | 5/2003 | Frich |
| 6,843,367 B1 | * | 1/2005 | Gentile et al. ............. 198/861.1 |
| 6,910,568 B1 | | 6/2005 | Ydoate et al. |
| 7,644,815 B2 | | 1/2010 | Federici et al. |
| 2002/0079194 A1 | | 6/2002 | Ydoate et al. |
| 2002/0084174 A1 | * | 7/2002 | Minardi ..................... 198/861.2 |

FOREIGN PATENT DOCUMENTS

| | | |
|---|---|---|
| DE | 9302962.4 | 5/1993 |
| EP | 0 343 613 A2 | 11/1989 |
| EP | 0461 348 A1 | 12/1991 |
| EP | 0481 341 A1 | 4/1992 |
| EP | 0 507 755 A1 | 10/1992 |
| EP | 0 565 498 A2 | 10/1993 |
| EP | 0619 252 A2 | 10/1994 |
| EP | 0 727 371 A1 | 8/1995 |
| EP | 0 752 381 A1 | 1/1997 |
| EP | 0 765 828 A1 | 4/1997 |
| EP | 0 774 426 A1 | 5/1997 |
| EP | 0 774 429 A1 | 5/1997 |
| EP | 0 774 430 A1 | 5/1997 |
| EP | 0 774 431 A1 | 5/1997 |
| EP | 0 780 328 A1 | 6/1997 |
| EP | 0 790 327 A1 | 8/1997 |
| EP | 0 927 689 A1 | 7/1999 |
| EP | 0 963 926 A1 | 12/1999 |
| EP | 0 963 929 A1 | 12/1999 |
| EP | 0 970 760 A2 | 1/2000 |
| EP | 1 216 938 A1 | 6/2002 |
| EP | 1 352 855 A1 | 10/2003 |
| EP | 1 352 857 A2 | 10/2003 |
| EP | 1 352 859 A2 | 10/2003 |
| GB | 2017034 | 3/1979 |
| GB | 2 170 768 A | 8/1986 |
| GB | 2 197 633 A | 5/1988 |
| GB | 2 224 147 A | 4/1990 |
| IT | 1235066 | 6/1992 |
| JP | 06-135525 A | 5/1994 |
| JP | 2002-284323 A | 10/2002 |
| JP | 2002284344 | 10/2002 |
| JP | 2003327324 | 11/2003 |
| JP | 2006-044801 | 2/2006 |
| JP | 2006124126 | 5/2006 |
| JP | 2006176273 | 7/2006 |
| JP | 2006200859 | 8/2006 |

OTHER PUBLICATIONS

Notification Concerning Transmittal of International Preliminary Report on Patentability for corresponding PCT Application No. PCT/US2008/087352; mailed Jul. 1, 2010.

* cited by examiner

UNSTACKING CONVEYOR WITH FLOATING SURFACE

FIELD

The present disclosure relates to belt conveyors for conveying articles, and more particularly, to such conveyors for unstacking the articles.

BACKGROUND

The statements in this section merely provide background information related to the present disclosure and may not constitute prior art.

The handling of items such as cartons, parcels, bundles, magazines, polybags, etc. often involves conveying the items in a bulk stream while stacked one upon the other. In order for the items to be properly handled, e.g., to redirect magazines to their intended destination, it may be necessary to first unstack the items. A belt conveyor can be arranged at a relatively steep angle to help unstack articles as they are being conveyed. The relatively steep angle can be at a downward angle (i.e., declined) or at an upward angle (i.e., inclined). In some instances, both a declined conveyor section and an inclined conveyor section can be used together in sequence.

As the articles are conveyed along the angled conveyor, upper articles that are stacked on lower articles tend to slide off. In addition, the angled conveyor can be made up of multiple conveyor belt segments, where each subsequent downstream belt can move at an increased belt travel speed to provide belt space for the upper articles as they slide off the lower articles. U.S. Pat. No. 6,491,154 to Ydoate, et al. discloses one exemplary unstacking belt conveyor, the disclosure of which is hereby incorporated herein by reference in its entirety.

SUMMARY

The present disclosure relates to a conveyor for unstacking articles in an article stream. This includes an angled conveyor and a stationary surface suspended above the angled conveyor to contact the article stream. The stationary surface may be positioned to exert a downward force on the articles. The stationary surface resists the tendency of articles to roll down toward the bottom of the angled conveyor.

In other aspects, the disclosure provides an inclined conveyor and a stationary surface suspended above the inclined conveyor to contact the article stream. The stationary surface exerts a moment on one of the articles related to an effective weight of the stationary surface acting on the one of the articles. The moment is greater than a counter-moment exerted on the one of the articles related to a coefficient of friction of the stationary surface.

In yet another aspect, a conveyor system for unstacking articles in an article stream is provided including a feed conveyor, a declined conveyor, and an inclined conveyor. A declined stationary surface is provided and suspended above the declined conveyor and positioned to exert a counter-moment on the articles related to the weight of the declined stationary surface and the coefficient of sliding friction of the declined stationary support surface. The counter-moment is sufficient to resist forward rotation of the articles down the declined conveyor. An inclined stationary surface is provided suspended above the inclined conveyor and positioned to exert a forward-moment on the articles related to the weight of the inclined stationary surface and the coefficient of sliding friction of the inclined stationary surface. The forward-moment is sufficient to resist counter-rotation of the articles that results in movement of the articles down the inclined conveyor.

The present disclosure also provides a method of unstacking articles in an article stream. The method may comprise suspending a stationary surface above an inclined conveyor. Articles may be fed along a conveyor to the inclined conveyor. The method includes exerting a forward conveying force on one of the articles due to friction between each article and the angled conveyor surface. A moment may be exerted on the one of the articles related to an effective weight of the stationary surface acting on the one of the articles that is greater than a counter-moment related to a coefficient of friction of the stationary surface acting on the one of the articles.

In another method of unstacking articles in an article stream, the present disclosure provides positioning a declined stationary surface above a declined conveyor and feeding the articles to the declined conveyor. The articles may be sandwiched between the declined conveyor and the stationary surface during a declined sandwiching period. The method includes conveying the articles forward due to the declined conveyor during the declined sandwiching period and exerting a counter-moment on the articles related to the weight of the stationary support surface and the coefficient of friction of the stationary support surface. The counter-movement is sufficient to resist forward rotation of the articles down the declined conveyor during the declined sandwiching period. An inclined stationary surface may be positioned above an inclined conveyor and articles are feed to the inclined conveyor. The articles may be sandwiched between the inclined conveyor and the stationary surface during an inclined sandwiching period. The method further includes conveying the secondarily sandwiched articles forward due to the inclined conveyor during the inclined sandwiching period and exerting a forward-moment on the articles related to the weight of the inclined stationary surface and the coefficient of friction of the inclined stationary surface. The forward-movement is sufficient to resist counter-rotation of the articles that results in movement of the articles down the inclined conveyor during the inclined sandwiching period.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
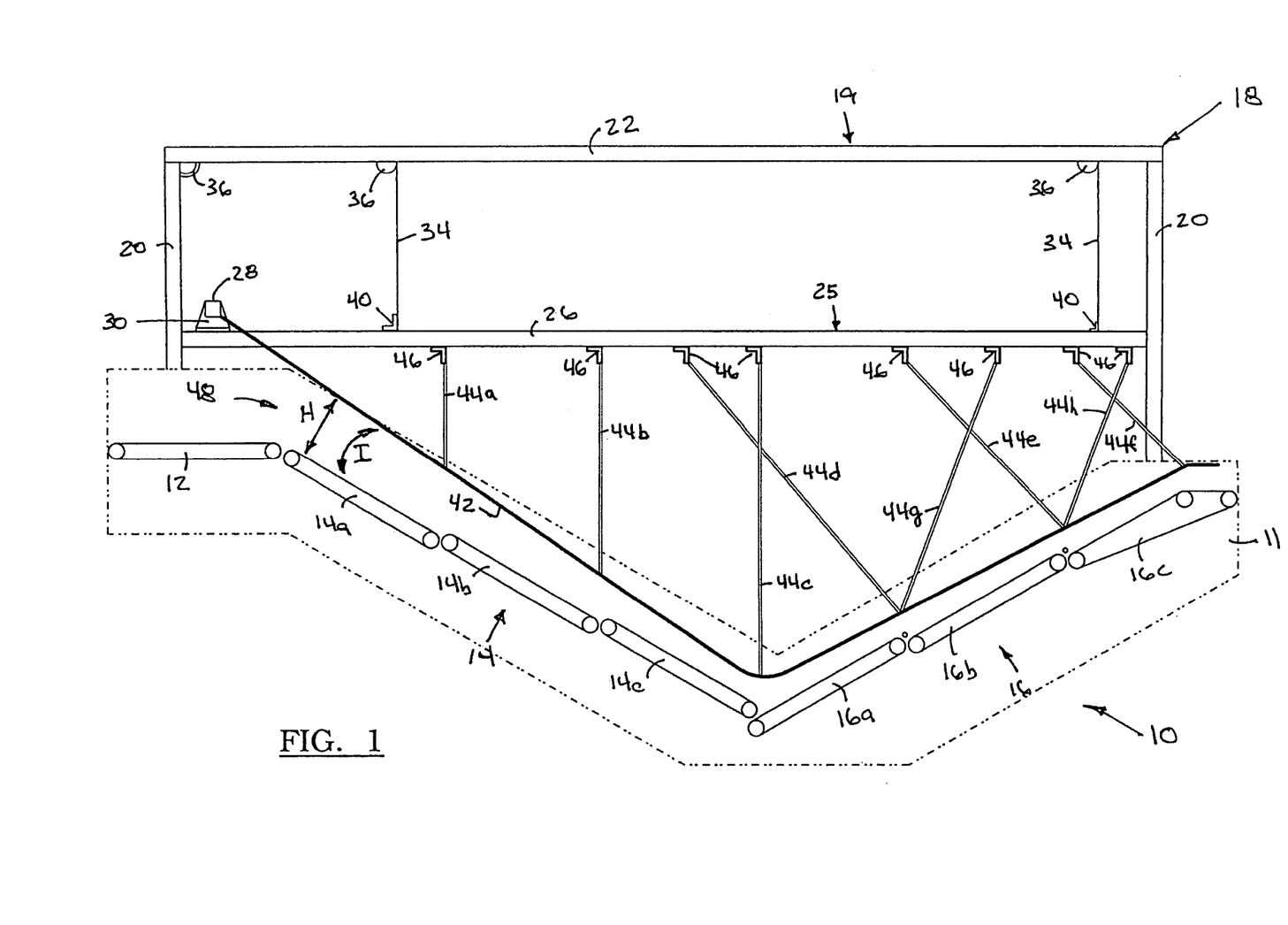
FIG. 1 is a side elevation view of one preferred embodiment of an unstacking conveyor.
Figure 2:
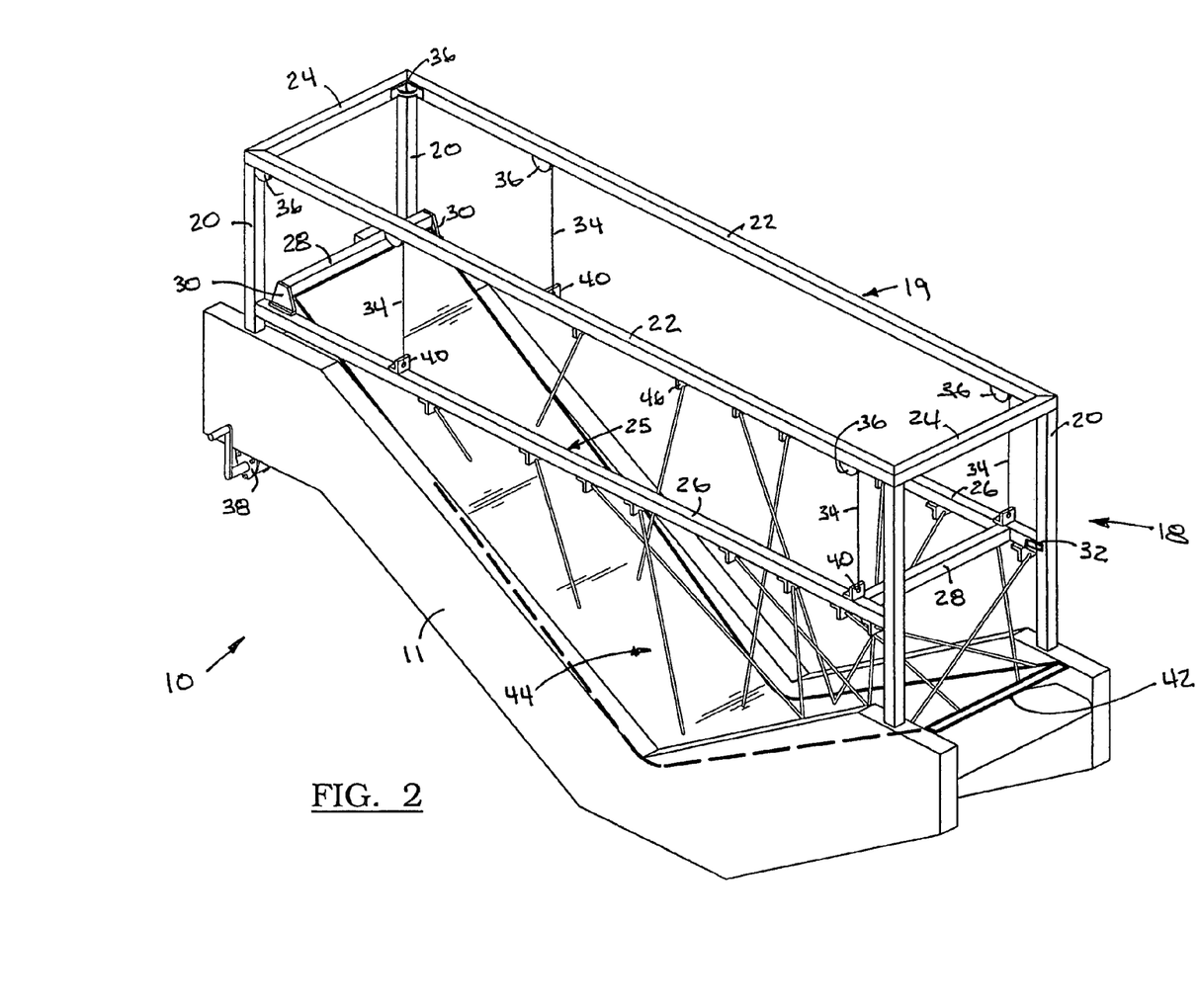
FIG. 2 is a simplified perspective view of the unstacking conveyor of FIG. 1.
Figure 3:
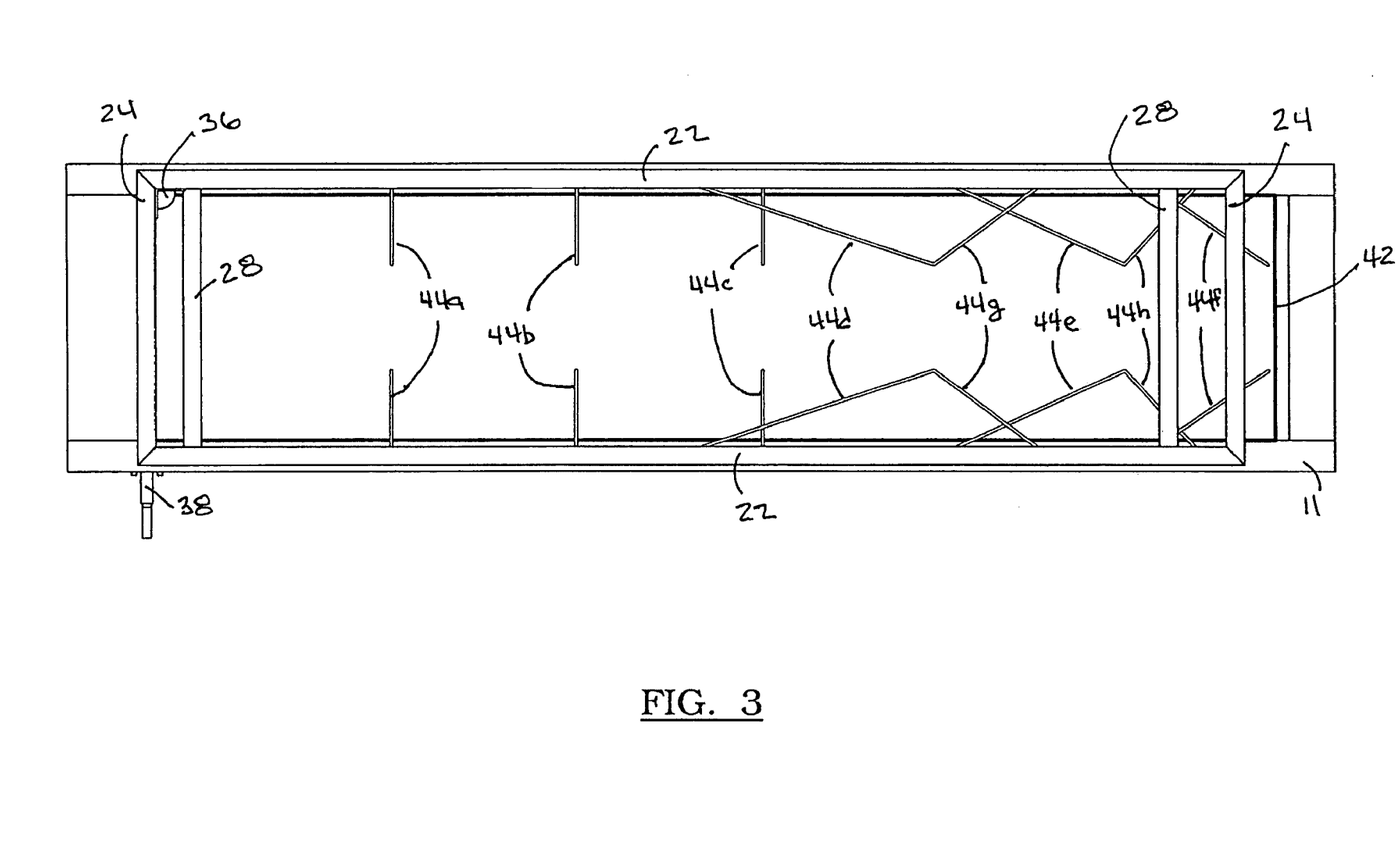
FIG. 3 is a top plan view of the unstacking conveyor of FIG. 1.

Referring to FIGS. 1-3, one preferred embodiment of an unstacking conveyor 10 is illustrated. As illustrated, the unstacking conveyor 10 includes a conveyor 11 comprising a feed conveyor 12, and two angled conveyors 14 and 16; specifically a declined conveyor 14 and an inclined conveyor 16. Each of the angled conveyors 14 and 16 is made up of a plurality of individual angled conveyors 14a, 14b, 14c, and 16a, 16b, and 16c, respectively. Each of the conveyors 12, 14 and 16, include a moving conveying surface illustrated herein as a belt. As is well-known and as illustrated in the drawings, such belt conveyors have a substantially planar surface and the surface does not include any article engaging features. It should be understood that, in certain aspects, the angled conveyors 14, 16 may also include at least one individual conveyor that is substantially horizontal. Additional details regarding the configuration and operation of such angled conveyors 14 and 16 is provided in previously incorporated U.S. Pat. No. 6,491,154 to Ydoate, et al. In an alternative, the conveyor 11 simply comprises a single angled conveyor. For example, the single angled conveyor is preferably an inclined conveyor 16.

A support structure 18 is coupled to the conveyor 11. In an alternative, a support structure can be coupled to the building floor or other building structure. The support structure 18 includes a fixed support frame 19 comprising four upright corner posts 20. The posts 20 are coupled at their lower ends to the conveyor 11. The posts 20 are coupled to each other at their upper ends by a pair of longitudinal support rails 22 and a pair of transverse support rails 24. Thus, the fixed support frame 19 includes the posts 20, the longitudinal support rails 22 and the transverse support rails 24.

In the illustrated embodiment, the support structure 18 additionally includes a vertically movable support frame 25. The vertically movable support frame 25 includes a pair of longitudinal support rails 26 and a pair of transverse support rails 28 coupled together. One of the transverse support rails 28 is indirectly coupled to the pair of longitudinal support rails 26 via a bracket 30 that locates the transverse support rail 28 vertically above the longitudinal support rails 26. Such a configuration can be desirable to increase the initial contact angle as discussed hereinafter.

The vertically movable support frame 25 is movably coupled to the fixed support frame 19. A bracket 32 (seen in FIG. 2) is coupled to each end of the longitudinal support rails 26 to extend from the interior face at the ends of the longitudinal support rails 26. As a result, the movable support frame 25 is horizontally fixed in position in relation to the posts 20 of the fixed support frame 19, but can move vertically with the bracket 32 riding along the interior faces of the posts 20. Frame support lines 34 couple the movable support frame 25 to the fixed support frame 19 via brackets 40. The frame support lines 34 extend around pulleys 36 and through interior cavities of the posts 20 and rails 22 and 24 to a vertical adjustment mechanism 38. In the illustrated preferred embodiment, the vertical adjustment mechanism 38 includes a hand crank. Alternatively, the vertical adjustment mechanism can comprise an electronically controlled or manually actuated switch and motorized system.

Surface support lines 44 couple the movable support frame 25 to a stationary surface 42 via brackets 46. As used herein, "lines" includes wires, cables, string, twine, ropes and equivalent structures. As used herein in regard to the surface 42, "stationary" means that the surface does not move forward to impart any forward conveying force to any articles being conveyed. Instead, any limited forward movement of the surface results only from contact with articles being conveyed forward by the conveying system. To be clear, in this context stationary does not relate to movement of the surface which may occur in any other direction. Specifically, stationary does not relate to the potential for vertical movement of the surface.

As seen in FIGS. 2 and 3, the surface support lines 44 all extend at an angle toward the middle of the stationary surface. In addition, the surface support lines 44 are provided in pairs 44a-44f so that a laterally outward force exerted on the stationary surface 42 by one of the surface support lines 44 is counterbalanced by the other surface support line in the pair. As a result, the surface support lines 44 tend to maintain the stationary surface centered above the angled conveyors 14 and 16.

The surface support lines above the declined conveyor 44a-44c extend substantially vertically as viewed from a side elevation perspective as seen, for example, in FIG. 1. The input end of the stationary surface 42 is coupled to the transverse rail 28. As a result, the surface support lines 44a-44c and the transverse rail 28 tend to maintain the surface 42 in a stationary position above the declined conveyor 14.

In addition, some of the surface support lines 44d-44f above the inclined conveyor 16 extend at an angle that is substantially perpendicular to a the stationary surface 42 in a resting position as viewed from a side elevation perspective. Some others of the surface support lines 44g-44h above the inclined conveyor 16 extend at an acute angle of the stationary surface 42 in a resting position as viewed from a side elevation perspective. As a result, the surface support lines 44 tend to maintain the surface in a stationary position above the inclined conveyor 16. As defined herein, the surface 42 is stationary despite limited forward movement that might occur as a result of the surface 42 being raised as articles pass under it. Such movement would typically be in a direction normal to the conveying surface. The surface support lines 44 suspend the stationary surface 42 above the conveyor 11 so that it does not contact the moving conveying surfaces thereof.

Returning to FIG. 1, the stationary surface 42 is positioned above the declined conveyor 14 to provide an input opening 48 between the declined conveyor 14 and the stationary surface 42. For clarity, the stationary surface 42 is the downward facing surface (toward the conveyors 14 and 16) of the supported material. In the illustrated embodiment, the input opening 48 is associated with a declined conveyor 14, but it may alternatively be associated with an inclined conveyor 16 or a feed conveyor 12. The height H of the input opening 48 is typically greater than the maximum expected height of the stream of articles being conveyed. The height H of the input opening 48 can optionally be adjustable.

As illustrated, the frame support lines 34 and pulleys 36 are configured to raise and lower the vertically movable frame 25 through operation of the hand crank 38. Thus, the stationary surface 42 can be raised or lowered. In addition to optionally permitting adjustment of the input opening height H, vertical adjustment of the movable frame 25 can permit access to articles below the stationary surface 42. Further, vertical adjustment of the movable frame 25 can permit selective use by positioning the stationary surface 42 at an appropriate height, or non-use of the stationary surface by raising the stationary surface 42 to a height at which it will not contact the article stream moving along the conveyor 11.

Associated with the input opening 48 is an initial contact angle I between the declined conveyor 14 and the stationary surface 42. As the plurality of articles in the stream of articles is delivered to the declined conveyor 14 by the feed conveyor and travel along the declined conveyor 14, the articles initially contact the stationary surface 42 the initial contact angle I.

This initial contact angle I is sufficiently small that any friction between the articles and the stationary surface 42 can be overcome by the friction between the articles and the declined conveyor 14. As a result, the articles continue to be conveyed along the declined conveyor 14 and are not stopped by their initial contact with the stationary surface 42.

Friction from the contact between the stationary surface 42 and the articles, including the friction of this initial contact, can also be reduced by providing the stationary surface 42 with a low coefficient of friction. For example, the coefficient of friction is preferably less than about 0.5; more preferably, less than about 0.4; and even more preferably, less than about 0.3. The stationary surface 42 can be provided by a uniform sheet of material, resulting in a coefficient of friction that is the same along the length of the stationary surface. Exemplary preferred materials include polycarbonate and low friction conveyor belting. In a particularly preferred embodiment, the stationary surface is comprised of a uniform sheet of polycarbonate, having a thickness of about 1/8 inch. This material has the additional advantage of being transparent, which allows visual access to the articles through the stationary surface. Alternatively, different materials or coatings can be used to provide different coefficients of friction at different points along the length of the stationary surface, or to adjust the weight associated with the stationary surface 42, or both.

The articles can be generally cube-shaped, i.e., all side dimensions are roughly equivalent. Such generally cubed-shaped articles have a tendency to forward-rotate on a declined conveyor 14, thereby rolling down the declined conveyor 14 toward the bottom thereof. In addition, such generally cube-shaped articles have a tendency to counter-rotate on an inclined conveyor 16, thereby rolling down the inclined conveyor 16 toward the bottom thereof. The weight associated with the stationary surface 42, however, resists the tendency of articles to roll down toward the bottom of the angled conveyor 14 and 16.

When the articles are generally round-shaped, the stationary surface 42 resists any tendency to roll down the angled conveyor 14 and 16. On the declined conveyor 14, instead of forward-rotating as occurs with rolling down the angle conveyor, generally round articles will counter-rotate. Thus, instead of rolling down the declined conveyor 14, such generally round-shaped articles will roll down the support surface 42. On the inclined conveyor 16, instead of tending to move down the angled conveyor 16 as occurs with rolling down the inclined conveyor 16, such generally round-shaped articles move up the inclined conveyor 16. Both the counter-rotation and moving up the inclined surface described above occur as a result of the generally round-shaped articles rolling on the stationary surface 42. Thus, the stationary surface 42 preferably generates sufficient friction to cause such generally round-shaped articles to roll on the stationary surface 42.

Figure 4:
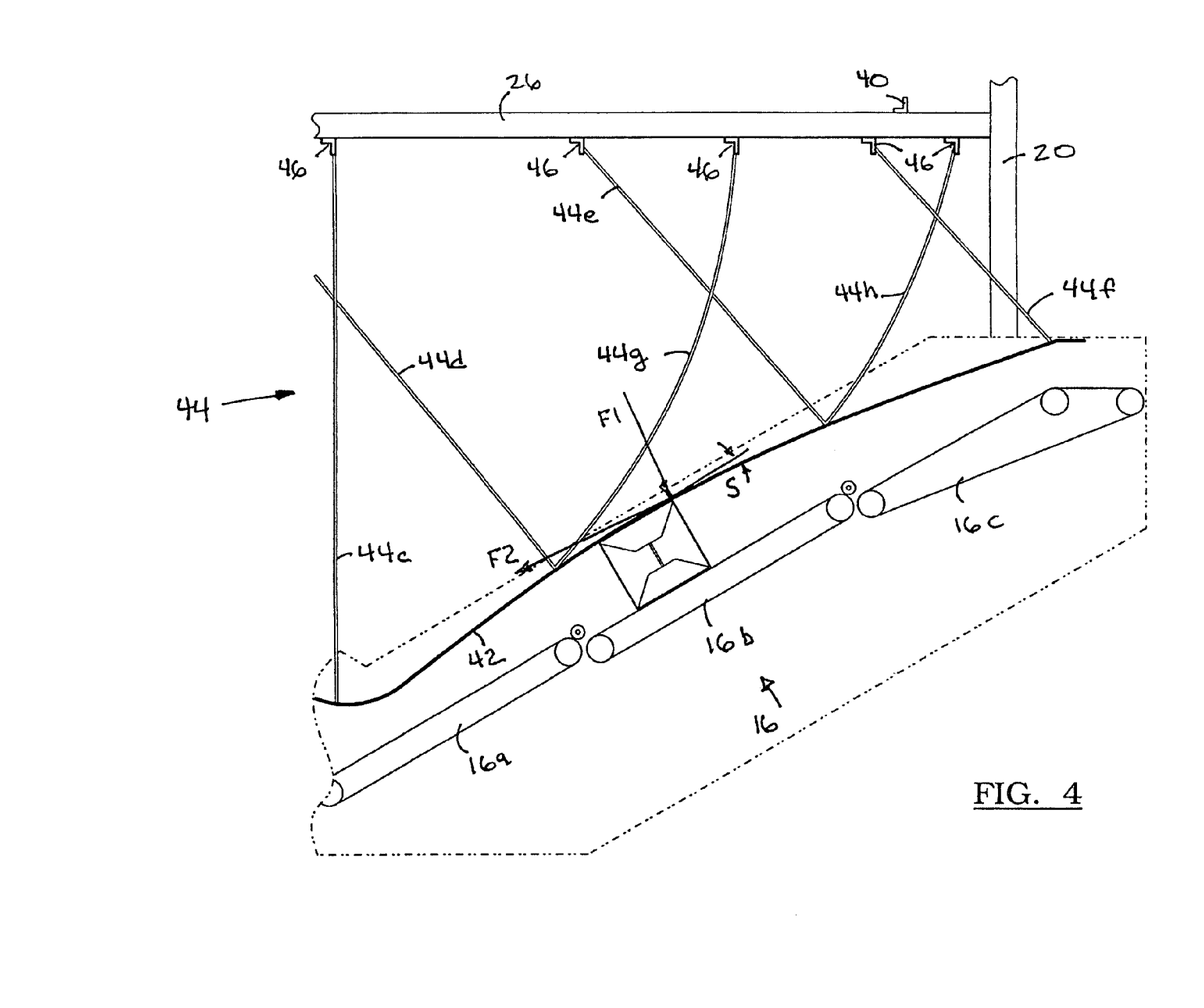
FIG. 4 is an exploded partial elevation view of the unstacking conveyor of FIG. 1 in operation.

Referring to FIG. 4 and returning to generally cube-shaped articles, the stiffness of the stationary surface can impact the relevant forces. A counter-directional resistance force F2 is a function of the friction coefficient, the stiffness contact angle S, and the force F1 resulting from the weight of the stationary surface acting on the article. On an inclined conveyor as seen in FIG. 4, the moment generated by F2 preferably does not exceed the upward force typically generated as a result of the F2 moment exceeding the total downward weight force F1. In other words, it may be beneficial for the cubic type items to slide along the stationary surface. The stiffness contact angle is preferably less than about 20 degrees; more preferably, less than about 15 degrees; and even more preferably, less than about 10 degrees. In addition, when the stationary surface is comprised of a uniform sheet of polycarbonate, the thickness of the sheet is preferably from about 1/16 inches to about 3/16 inches; and more preferably, from about 3/32 inches to about 5/32 inches, or 1/8 inches. It should be understood, however, that the ideal thickness may vary with the size and weight of an article. For example, smaller articles may require thinner materials and larger articles may require thicker materials, assuming a similar flexural modulus.

In instances where the stationary surface is above the declined conveyor, there may be a tendency of articles to counter rotate. Thus, in certain aspects, F1 and F2 are coordinated such that enough downward force is provided to resist or oppose such a downward rotation tendency.

In an alternative preferred embodiment not specifically illustrated herein, the conveyor system may include only an inclined conveyor. Thus, a declined conveyor would not be provided. In addition, the vertically movable support frame is eliminated in such an alternative preferred embodiment. For example, the surface support lines would be attached directly to appropriately positioned longitudinal rails of a fixed support frame. Although these two alternatives are described herein in relation to a single alternative embodiment, as with all of the alternatives described herein, the various alternatives may be individually selected to provide any desired combination of alternatives for an alternative preferred embodiment.

The foregoing discussion discloses and describes merely exemplary preferred arrangements of the present invention. One skilled in the art will readily recognize from such discussion, and from the accompanying drawings and claims, that various changes, modifications and variations can be made therein without departing from the spirit and scope of the invention as defined in the following claims. Further, there may be alternative preferred arrangements to those specifically described herein, and therefore, the use of "preferred" herein or the failure to mentions a specific alternative is not intended to exclude any such alternative arrangements.

What is claimed is:

1. A conveyor for unstacking articles in an article stream comprising:
   an angled conveyor including a substantially planar moving conveying member surface;
   a stationary surface suspended above the angled conveyor to contact the article stream without contacting the moving conveying member;
   a support frame, and a plurality of support lines coupling the support frame to the stationary surface, at least some of the support lines being angled toward an upstream direction as they approach the stationary surface, and at least some of the support lines being angled toward a downstream direction as they approach the stationary support surface, thereby suspending the stationary surface above the angled conveyor to contact the article stream;
   wherein the stationary surface is positioned to contact the articles and thereby exert a downward force on the articles; and wherein the stationary surface, in response to contact with the articles, is stationary in relation to a direction of movement of the article stream, but moveable in relation to an upward direction perpendicular to the direction of movement.

2. The conveyor according to claim 1, wherein the stationary surface has a coefficient of friction below a threshold that would induce counter-rotation in at least one of the articles that has a generally cube-shape, and wherein the stationary surface has a weight, stiffness, and coefficient of friction that is above a threshold required to cause another one of the articles that has a generally circular shape to roll on the stationary surface.

3. The conveyor according to claim 1, wherein an input opening is provided between the stationary surface and the angled conveyor, and wherein the input opening has a height that is greater than a maximum expected height of the article stream.

4. The conveyor according to claim 1, wherein an initial contact angle is formed between the stationary surface and the angled conveyor, and wherein the initial contact angle is sufficiently small that any friction between the articles and the stationary surface is less than any friction between the articles and the angled conveyor.

5. The conveyor according to claim 1, wherein the stationary surface comprises a transparent material, thereby permitting visual access to the articles through the stationary surface.

6. The conveyor according to claim 1, wherein the stationary surface comprises a material having a stiffness resulting in a stiffness contact angle S below that at which a countermoment generated by any friction between one of the articles and the stationary surface is less than a moment generated by an effective weight of the stationary surface acting on the one of the articles.

7. The conveyor according to claim 1, wherein the support frame comprises a fixed support frame and a vertically movable support frame coupled to the fixed support frame via a plurality of frame support lines, and further comprising a vertical adjustment mechanism associated with the frame support lines.

8. The conveyor according to claim 1, wherein at least some of the support lines are angled toward lateral sides of the conveyor.

9. The conveyor according to claim 1, wherein the angled conveyor comprises an inclined conveyor.

10. The conveyor according to claim 1, wherein the angled conveyor comprises an inclined conveyor and a declined conveyor.

11. A conveyor for unstacking articles in an article stream comprising:
an angled conveyor having a substantially planar moving conveying member surface;
a stationary surface, suspended above the angled conveyor to contact the article stream, and the stationary surface having a stiffness such that a stiffness contact angle S results from contact with the article;
a support frame, and a plurality of support lines coupling the support frame to the stationary surface, at least some of the support lines being angled toward an upstream direction as they approach the stationary surface, and at least some of the support lines being angled toward a downstream direction as they approach the stationary surface, thereby suspending the stationary surface above the angled conveyor to contact the article stream;
wherein the stationary surface exerts a force on one of the articles related to an effective weight of the stationary surface acting on the one of the articles.

12. The conveyor according to claim 11, wherein an input opening is provided between the stationary surface and the angled conveyor, wherein an initial contact angle is formed between the stationary surface and the angled conveyor adjacent the input opening, and wherein the initial contact angle is sufficiently small that any rearward friction between the articles and the stationary surface is less than any forward friction between the articles and the declined conveyor.

13. The conveyor according to claim 11, wherein the stationary surface comprises a transparent material, thereby permitting visual access to the articles through the stationary surface.

14. The conveyor according to claim 11, wherein the stiffness contact angle S is less than about 20 degrees.

15. The conveyor according to claim 11, wherein at least some of the support lines are angled toward a center of the stationary surface as they approach the stationary surface.

16. The conveyor according to claim 11, wherein the support frame comprises a fixed support frame and a vertically movable support frame coupled to the fixed support frame via a plurality of frame support lines, and further comprising a vertical adjustment mechanism associated with the frame support lines.

17. The conveyor according to claim 16, wherein the vertical adjustment mechanism comprises a hand crank.

18. The conveyor according to claim 11, wherein the angled conveyor comprises an inclined conveyor.

19. The conveyor according to claim 11, wherein the angled conveyor comprises an inclined conveyor and a declined conveyor.

20. A conveyor for unstacking articles in an article stream comprising:
a conveyor system comprising a feed conveyor, a declined conveyor, and an inclined conveyor;
a declined stationary surface suspended above the declined conveyor by support lines and positioned to contact articles in the article stream;
an inclined stationary surface suspended above the inclined conveyor by support lines and positioned to contact articles in the article stream;
wherein at least one of the support lines extends at an acute angle relative to horizontal with an origin of the acute angle being at a lower end of the at least one of the support lines and the at least one of the support lines extends upwardly from the origin toward an upstream side of the conveyor system; and
wherein at least another of the support lines extends at an acute angle relative to horizontal with an origin of the acute angle being at a lower end of the at least one of the support lines and the at least another of the support lines extends upwardly from the origin toward a downstream side of the conveyor system.

21. The conveyor according to claim 20, wherein an input opening is provided between the stationary surface and the declined conveyor, wherein an initial contact angle is formed between the stationary surface and the declined conveyor adjacent to the input opening, and wherein the initial contact angle is sufficiently small that any rearward friction between the articles and the stationary surface is less than any forward friction between the articles and the declined conveyor.

22. The conveyor according to claim 20, wherein the stationary surface comprises a transparent material, thereby permitting visual access to the articles through the stationary surface.

23. The conveyor according to claim 20, wherein the stationary surface comprises a material having a stiffness resulting in a stiffness contact angle S that is less than about 20 degrees.

24. The conveyor according to claim 20, wherein at least one of the at least one of the support lines, the at least another of the support lines, or an additional support line extends at an acute angle relative to horizontal and from an origin of the angle toward a first lateral side of the conveyor system, and wherein at least one of the at least one of the support lines, the at least another of the support lines, or an additional support line extends at an acute angle relative to horizontal and from an origin of the angle toward an opposite lateral side of the conveyor system.

25. A method of unstacking articles in an article stream, the method comprising:
suspending a stationary surface above an angled conveyor, comprising a conveying moving member surface without any article-engaging features, with a plurality of support lines;
extending at least one of the plurality of support lines from a stationary surface at an acute angle relative to horizontal with an origin of the acute angle being at a lower end of the at least one of a plurality of support lines, and with the at least one of the support lines extending upwardly from the origin toward an upstream side of the angled conveyor;

feeding the articles along another conveyor to the angled conveyor;

exerting a forward conveying force on one of the articles due to friction between each article and the angled conveyor surface; and exerting a force on the one of the articles related to an effective weight of the stationary surface acting on the one of the articles thereby sandwiching the one of the articles between the stationary surface and the conveying moving member and sliding the one of the articles along the stationary surface;

wherein the stationary surface, in response to contact with the articles, is stationary in relation to a direction of movement of the article stream, but moveable in relation to an upward direction perpendicular to the direction of movement.

26. The method according to claim 25, further comprising providing the stationary surface with a sufficiently low coefficient of friction that an associated friction force that is exerted on the one of the articles in a rearward conveying direction that is less than the forward conveying force.

27. The method according to claim 26, further comprising viewing the articles through the stationary surface as they are sandwiched between the stationary surface and the angled conveyor.

28. The method according to claim 25, further comprising raising the stationary support surface to a minimum height above the angled conveyor that is greater than an expected height of the article stream, thereby temporarily removing any contact between the articles and the stationary surface when the articles have a configuration that does not tend to move down the angled conveyor during operation.

29. The method according to claim 25, further comprising adjusting the stationary support surface to create an input opening having a height above the angled conveyor that is greater than an expected maximum height of the article stream and to form an initial contact angle between the stationary surface and the angled conveyor that is sufficiently small that any friction between the articles and the stationary surface is less than any friction between the articles and the angled conveyor.

30. The method according to claim 25, further comprising associating a material with the stationary surface having a stiffness resulting in a stiffness contact angle S that is less than about 20 degrees.

31. The method according to claim 25 wherein suspending a stationary surface above an angled conveyor comprises suspending a stationary surface above an inclined conveyor.

32. The method according to claim 25 wherein suspending a stationary surface above an angled conveyor comprises suspending a stationary surface above an inclined conveyor and a declined conveyor.

33. The method according to claim 25, further comprising extending at least another of the plurality of support lines from a stationary surface at an acute angle relative to horizontal with an origin of the acute angle being at a lower end of the at least one of a plurality of support lines, and with the at least another of the support lines extending upwardly from the origin toward an downstream side of the angled conveyor.

34. The method according to claim 25, further comprising extending some of the support lines toward the center of the stationary surface as they approach the origin of the acute angle.

35. A method of unstacking articles in an article stream, the method comprising:

suspending a stationary surface above an angled conveyor from a plurality of support lines;

extending at least one of the plurality of support lines at an acute angle relative to horizontal with an origin of the acute angle being at a lower end of the at least one of a plurality of support lines, and with the at least one of the support lines extending upwardly from the origin toward an upstream side of the angled conveyor;

feeding the articles to the angled conveyor;

sandwiching the articles between the angled conveyor and the stationary surface, during a sandwiching period;

conveying the articles forward due to the angled conveyor;

exerting a force on the articles related to the weight of the stationary support surface.

36. The method according to claim 35, wherein the articles slide along the stationary surface during the sandwiching period.

37. The method according to claim 35, further comprising viewing the articles through the stationary surface during the sandwiching period.

38. The method according to claim 35, further comprising raising the stationary surface to a minimum height above the angled conveyor that is greater than an expected maximum height of the article stream, thereby temporarily removing any contact between the articles and the stationary surface when the articles have a configuration that does not tend to roll down toward the bottom of the angled conveyor during operation.

39. The method according to claim 35, further comprising adjusting the stationary surface to create an input opening having a height above the angled conveyor that is greater than an expected maximum height of the article stream and to form an initial contact angle between the stationary surface and the angled conveyor that is sufficiently small that any friction between the articles and the stationary surface is less than any friction between the articles and the angled conveyor.

40. The method according to claim 35, further comprising forming the stationary surface of a material having a stiffness resulting in a stiffness contact angle S that is less than about 20 degrees.

41. The method according to claim 35 wherein suspending a stationary surface above an angled conveyor comprises suspending a stationary surface above an inclined conveyor.

42. The method according to claim 35 wherein suspending a stationary surface above an angled conveyor comprises suspending a stationary surface above an inclined conveyor and a declined conveyor.

43. The method according to claim 35, further comprising extending at least another of the plurality of support lines from a stationary surface at an acute angle relative to horizontal with an origin of the acute angle being at a lower end of the at least one of a plurality of support lines, and with the at least another of the support lines extending upwardly from the origin toward an downstream side of the angled conveyor.

44. The method according to claim 35, further comprising extending some of the support lines toward the center of the stationary surface as they approach the origin of the acute angle.

* * * * *